US012449691B2

United States Patent
Zhang et al.

(10) Patent No.: US 12,449,691 B2
(45) Date of Patent: Oct. 21, 2025

(54) DISPLAY PANEL AND ELECTRONIC TERMINAL

(71) Applicant: Wuhan China Star Optoelectronics Technology Co., Ltd., Hubei (CN)

(72) Inventors: Guiyang Zhang, Hubei (CN); Jiuhui Zhu, Hubei (CN); Chengzhi Luo, Hubei (CN); Pengfei Zhang, Hubei (CN); Rui He, Hubei (CN); Guowei Zha, Hubei (CN); Guanghui Liu, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 18/289,035

(22) PCT Filed: Jun. 29, 2023

(86) PCT No.: PCT/CN2023/104135
§ 371 (c)(1),
(2) Date: Oct. 31, 2023

(87) PCT Pub. No.: WO2024/198130
PCT Pub. Date: Oct. 3, 2024

(65) Prior Publication Data
US 2025/0085582 A1   Mar. 13, 2025

(30) Foreign Application Priority Data

Mar. 30, 2023 (CN) .......................... 202310336800.X

(51) Int. Cl.
*G02F 1/1335* (2006.01)
*G02F 1/1333* (2006.01)
*G02F 1/1362* (2006.01)

(52) U.S. Cl.
CPC .. *G02F 1/133507* (2021.01); *G02F 1/133345* (2013.01); *G02F 1/133357* (2021.01);
(Continued)

(58) Field of Classification Search
CPC ......... G02F 1/133507; G02F 1/133345; G02F 1/133357; G02F 1/133514; G02F 1/133528; G02F 1/1362; G02F 2201/50
See application file for complete search history.

(56) References Cited

U.S. PATENT DOCUMENTS 5,349,453 A      9/1994  Munakata
5,808,712 A *    9/1998  Hishida ............. G02F 1/133526
                                                        349/95

(Continued)

FOREIGN PATENT DOCUMENTS

CN    103529592    1/2014
CN    106990602    7/2017
(Continued)

OTHER PUBLICATIONS

International Search Report and the Written Opinion Dated Nov. 20, 2023 From the International Searching Authority Re. Application No. PCT/CN2023/104135 and Its Translation Into English. (19 Pages).

*Primary Examiner* — Kevin Quarterman

(57) ABSTRACT

A display panel and an electronic terminal are provided, including a plurality of opening areas, an array substrate, a color filter substrate positioned opposite to the array substrate, a backlight module arranged on one side of the array substrate away from the color filter substrate; and an optical layer disposed in at least one of the color filter substrate and the array substrate. The color filter substrate includes color resist portions in the respective opening areas. The optical (Continued)

layer is configured to converge light and is arranged corresponding to the color resist portions.

19 Claims, 7 Drawing Sheets

(52) U.S. Cl.
CPC .. *G02F 1/133514* (2013.01); *G02F 1/133528* (2013.01); *G02F 1/1362* (2013.01); *G02F 2201/50* (2013.01)

(56) References Cited

U.S. PATENT DOCUMENTS

| | | | |
|---|---|---|---|
| 11,209,690 B2 | 12/2021 | Yang | |
| 11,366,351 B2 | 6/2022 | Xu | |
| 2011/0205468 A1* | 8/2011 | Hirakata | G02F 1/133526 349/95 |
| 2014/0125928 A1* | 5/2014 | Chen | G02F 1/133514 349/106 |
| 2018/0359461 A1* | 12/2018 | Koerber | H04N 13/305 |
| 2020/0174279 A1* | 6/2020 | Ishihara | H04N 13/305 |

FOREIGN PATENT DOCUMENTS

| | | |
|---|---|---|
| CN | 109581729 | 4/2019 |
| CN | 115064567 | 9/2022 |
| CN | 115701235 | 2/2023 |

\* cited by examiner

DISPLAY PANEL AND ELECTRONIC TERMINAL

RELATED APPLICATIONS

This application is a National Phase of PCT Patent Application No. PCT/CN2023/104135 having International filing date of Jun. 29, 2023, which claims the benefit of priority of China Patent Application No. 202310336800.X filed on Mar. 30, 2023. The contents of the above applications are all incorporated by reference as if fully set forth herein in their entirety.

TECHNICAL FIELD

The present application relates to a field of display technology, and in particular to the manufacturing of display devices, specifically a display panel and an electronic terminal.

DESCRIPTION OF RELATED ART

Liquid crystal displays can be applied to small-sized smartphone screens as well as large-sized computer and television screens, and have become the mainstream products in the display industry.

However, in augmented reality (AR) technology, liquid crystal displays contain many optical film layers, causing outgoing light at large angles (e.g., greater than 45°) to often create interference light between the optical film layers, affecting the display quality.

Therefore, conventional liquid crystal displays used in AR technology face the issue of relatively poor display quality and are in urgent need of improvement.

SUMMARY OF INVENTION

The objective of the present application is to provide a display panel and an electronic terminal to address the technical issue of poor display quality caused by large-angle light in conventional liquid crystal displays when applied to AR technology.

The present application provides a display panel, provided with a plurality of opening areas, the display panel including:
an array substrate;
a color filter substrate disposed opposite to the array substrate and including a plurality of color resist portions located in the opening areas;
a backlight module disposed on one side of the array substrate away from the color filter substrate; and
an optical layer disposed in at least one of the color filter substrate and the array substrate and arranged corresponding to at least the color resist portions, wherein the optical layer converges light.
In one embodiment, the optical layer includes:
an optical structure layer, including a plurality of protrusions; and
an optical protective layer, at least disposed on a first side of the optical structure layer, wherein the first side is a side where the protrusions protrude;
wherein a refractive index of the protrusions is greater than a refractive index of the optical protective layer.
In one embodiment, the color filter substrate includes:
a first substrate; and
a color filter layer disposed on one side of the first substrate near the array substrate and including the color resist portions;
wherein the optical layer is disposed between the first substrate and the color filter layer, or the optical layer is disposed on one side of the color filter layer near the array substrate.
In one embodiment, the color filter substrate includes:
an upper polarizer disposed on one side of the color resist portions away from the array substrate;
wherein the optical layer is disposed on one side of the upper polarizer away from the color resist portions, or the optical layer is disposed on one side of the upper polarizer near the color resist portions.
In one embodiment, the array substrate includes:
a second substrate; and
a circuit layer disposed on one side of the second substrate near the color filter substrate and including a plurality of driving transistors disposed corresponding to the color resist portions,
wherein the optical layer is disposed on one side of the circuit layer near the color filter substrate, or the optical layer is disposed on one side of the second substrate away from the color filter substrate.
In one embodiment, the array substrate includes:
a metal layer;
an insulating layer disposed on at least one side of the metal layer and arranged in a same layer as the optical structure layer; and
a planarization layer disposed on at least one side of the insulating layer and arranged in the same layer as the optical protective layer.
In one embodiment, the protrusions include a plurality of first protrusions, the first protrusions are column-shaped, a top of each of the first protrusions is parallel to a bottom of the first protrusion, and at least one side of each of the first protrusions is parallel to and located close to either the array substrate or the color filter substrate;
wherein in a length direction, an orthographic projection of each of the first protrusions projected on the color filter substrate covers n of the color resist portions of a same color, n is a positive integer; an orthographic projection of the top of each first protrusion projected on the color filter substrate is positioned between two corresponding ones of the color resist portions; and an orthographic projection of the bottom of each first protrusion is positioned between two corresponding ones of the color resist portions.
In one embodiment, the color resist portions are covered in a width direction by an orthographic projection of m consecutive and parallel ones of the first protrusions projected on the color filter substrate, with m being a positive integer, and an orthographic projection of the at least one side of each of the m first protrusions projected on the color filter substrate is located between corresponding two of the color resist portions.
In one embodiment, a boundary of the orthographic projection of each of the first protrusions projected on the color filter substrate is located between the corresponding color resist portion and the adjacent color resist portion, and the orthographic projection of each of the first protrusions projected on the color filter substrate forms an angle with the corresponding color resist portion.
In one embodiment, the protrusions include a plurality of second protrusions, and the second protrusions are in a shape of cone, truncated cone, or hemisphere; at least one of a top and a bottom of each of the second protrusions is parallel to the array substrate;

wherein an orthographic projection of each of the second protrusions projected on the color filter substrate covers the corresponding color resist portion, and a boundary of the orthographic projection of each of the second protrusions projected on the color filter substrate is positioned between the color resist portions.

In one embodiment, the optical protective layer is flat on one side away from the optical structure layer;

or alternatively, one side of the optical protective layer away from the optical structure layer is provided with a recessed area, recessed from one side close to the optical protective layer and located in a gap of the optical protective layer between every two adjacent protrusions, as compared to a portion of the optical protective layer corresponding to the protrusions, wherein the recessed area is filled with black portions between every two adjacent color resist portions.

In one embodiment, the array substrate includes:

a second substrate; and a circuit layer disposed on one side of the second substrate near the color filter substrate and including a first metal layer and a second metal layer located on one side of the first metal layer near the color filter substrate, wherein a reflectance of the first metal layer is greater than a reflectance of the second metal layer.

The present application provides an electronic terminal, including the display panel mentioned in any of the above disclosures.

Beneficial Effects

This application provides a display panel and an electronic terminal that include multiple opening areas, including: an array substrate; a color filter substrate disposed opposite to the array substrate and including a plurality of color resist portions located in the respective opening areas; a backlight module disposed on one side of the array substrate, away from the color filter substrate. Through configuring the optical layer for light convergence to be positioned within at least one of the color filter substrate and the array substrate, and by arranging the optical layer to be disposed corresponding to at least the color resist portions, this application effectively focuses large-angle light towards a central area of the display panel. Consequently, the light passing through the optical layer is composed of smaller-angle rays, reducing an amount of interference light and enhancing the display quality of the display panel.

BRIEF DESCRIPTION OF DRAWINGS

The present application is further described below through the accompanying drawings. It should be noted that the drawings in the following descriptions are intended solely to explain certain embodiments of this application. Those skilled in the art may derive additional drawings based on these drawings, without engaging in inventive work.

DETAILED DESCRIPTION OF EMBODIMENTS

Figure 1:
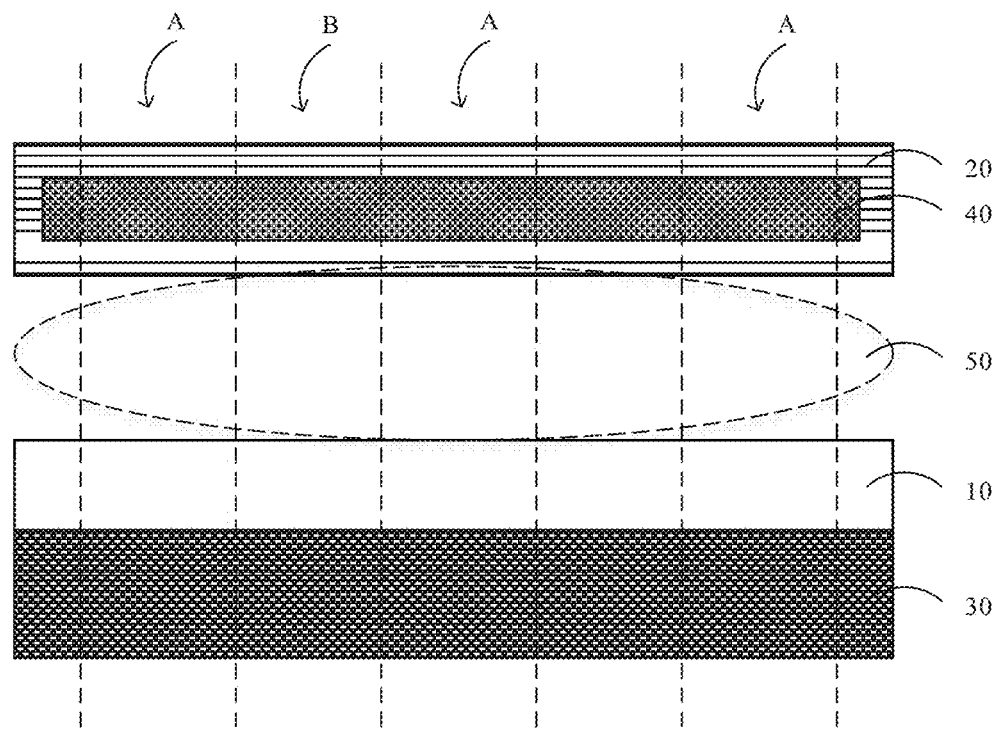
FIGS. 1 to 8 are cross-sectional schematic views illustrating eight scenarios of a display panel provided by embodiments of the present application.

Below, a clear and comprehensive description of the technical solutions in the embodiments of this application is provided in conjunction with the accompanying drawings. It is evident that the described embodiments represent only some of the embodiments within this application, not the entirety of the embodiments. Based on the embodiments presented in this application, all other embodiments obtained by those skilled in the art without engaging in inventive work are within the protection scope of this application.

In the description of this application, it should be understood that terms such as "above," "near," "far from," and the like indicating directional or positional relationships are based on the orientation or positional relationships as depicted in the drawings. For example, "above" simply means above the surface of an object, and specifically refers to directly above, diagonally above, or being on the upper surface, as long as it is positioned above the object horizontally. "Two sides" refers to two opposite positions of the object that can be reflected in the drawings, and these two positions can either directly or indirectly contact the object. The above directional or positional relationships are used for the convenience of describing this application and simplifying the description and do not imply or indicate that the device or element must have specific orientations, be constructed in specific orientations, or operate in specific orientations. Therefore, they should not be interpreted as limitations on this application. Furthermore, terms like "first," "second," and so on are used solely for descriptive purposes and should not be construed as indicating relative importance or implying a specific number of technical features being referred to. As a result, features designated as "first," "second," etc., may explicitly or implicitly include one or more of the specified features.

Additionally, it should be noted that the drawings only provide structures and steps closely related to this application and may omit certain details that are less relevant to the application. The purpose of this is to simplify the drawings to make the key points of the application clear, and it should not be construed as indicating that the actual devices and methods are identical to the diagrams. The drawings are not intended to limit the devices and methods in practice.

This application provides a display panel. The display panel includes, but is not limited to, the following embodiments and combinations of the following embodiments.

In one embodiment, as shown in conjunction with FIGS. 1 to 8, a display panel 100 includes a plurality of opening areas A, including: an array substrate 10; a color filter substrate 20 positioned opposite to the array substrate 10 and including a plurality of color resist portions 01 located within the opening areas A; a backlight module 30 located on one side of the array substrate 10 away from the color filter substrate 20; and an optical layer 40 positioned within at least one of the color filter substrate 20 and the array substrate 10 (FIG. 1 only shows the optical layer 40 being located within the color filter substrate 20 as an example), the optical layer 40 being disposed corresponding to at least the color resist portions 01. The optical layer 40 is used for light convergence. Furthermore, the color filter layer 202 can also include a black matrix 02, which can be understood as the black matrix 02 filling gaps formed by the color resist portions 01. A portion of the black matrix 02 disposed between adjacent and differently colored color resist portions 01 can block and absorb light of different colors produced after passing through the differently colored color resist portions 01, reducing the risk of color crosstalk.

In particular, as shown in FIG. 1, the display panel 100 can also include non-opening areas B. Inner boundaries of the non-opening areas respectively constitute the outer boundaries of the opening areas A. The array substrate 10 can include a plurality of pixel electrodes located within the opening areas A, a plurality of pixel drive circuits located within the non-opening areas B, and a plurality of gate lines and a plurality of data lines crossing each other. Each pixel drive circuit is electrically connected to the corresponding gate line, the corresponding data line, and the corresponding pixel electrode, so that a corresponding pixel voltage is generated on the corresponding pixel electrode under the influence of the corresponding gate line and the corresponding data line. Furthermore, there can be a liquid crystal layer 50 positioned between the array substrate 10 and the color filter substrate 20. The color filter substrate 20 can include a common electrode disposed corresponding to at least the pixel electrodes and loaded with a common voltage. Certainly, the common electrode can also be designed as an entire layer. The liquid crystal molecules situated above each pixel electrode within the liquid crystal layer 50 can be angularly deflected, rotating by corresponding angles, under the influence of the common voltage and the corresponding pixel voltage. This deflection allows the passage of a corresponding amount of light emitted by the backlight module 30, which, when combined with the light-filtering effect of the corresponding color resist portions 01, ultimately presents colors with the corresponding brightness.

It should be noted that, in technologies such as augmented reality (AR), various optical film layers, including but not limited to reflective layers, light guide layers, diffusion layers, prism layers, and more, may be incorporated into components such as the backlight module 30. This can result in interference light being formed between these optical film layers when the backlight module 30 emits light at large angles (e.g., greater than 45°), thus affecting the display quality. In this embodiment, it can be understood that by carrying out a configuration in which the optical layer 40 for light convergence 40 is provided within at least one of the color filter substrate 20 and the array substrate 10, at least the light emitted by the backlight module 30 towards a light emitting side of the display panel 100 can pass through the optical layer 40 and undergoes convergence due to the light-concentrating effect of the optical layer 40, particularly focusing large-angle light towards a center of the display panel 100. As a result, the light exiting the optical layer 40 is composed of smaller-angle rays, reducing an amount of interfering light and enhancing the display quality of the display panel 100. Furthermore, by decreasing lower-efficiency large-angle light, the power consumption of the display panel 100 is reduced and the product's battery life is improved, which is beneficial for the development of high-resolution products.

In one embodiment, as shown in conjunction with FIGS. 1 to 8, the optical layer 40 includes: an optical structure layer including protrusions 401; and an optical protective layer 402 disposed at least on a first side of the optical structure layer, the first side being a side where the protrusions 401 protrude. A refractive index of the protrusions 401 is greater than a refractive index of the optical protective layer 402. The protrusions 401 can be understood as structures that both converge light and have a protruding shape. The specific structure and orientation of these protrusions 401 are not limited here. The refractive index of the protrusions 401 can be greater than a refractive index of the layer below the protrusions 401, whether the protrusions 401 are oriented upwards or downwards. This allows incident light to be converged once within the protrusions 401. Furthermore, the refractive index of the protrusions 401 can be greater than a refractive index of the layer above the protrusions 401. This allows light to be converged again as the light exits the protrusions 401, thereby further improving the light-converging effect.

Understandably, in conjunction with the preceding discussion, the optical protective layer 402 is disposed at least on the first side of the optical structure layer, where the first side is the side on which the protrusions 401 are raised. On one hand, in this embodiment, the refractive index of the protrusions 401 is greater than the refractive index of the optical protective layer 402. This means that whether light enters the protrusions 401 from the optical protective layer 402 or from the protrusions 401 into the optical protective layer 402, the light is converged at least once. On the other hand, the optical protective layer 402 in this embodiment can cover the side of the optical structure layer where the protrusions 401 are raised, providing a certain flattening effect on the "protrusions," and effectively blocking the protrusions 401. This facilitates the combination of the optical layer 40 with adjacent film layers, enhancing the reliability of the manufacturing process for the display panel 100.

The number of the protrusions 401 can be 1 or equal to the number of the color resist portions 01 to achieve a one-to-one correspondence with the color resist portions 01.

Figure 8:
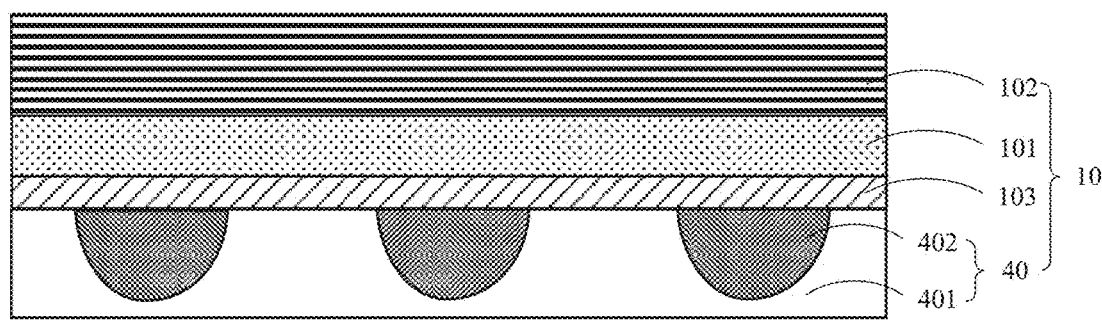
Figure 9:
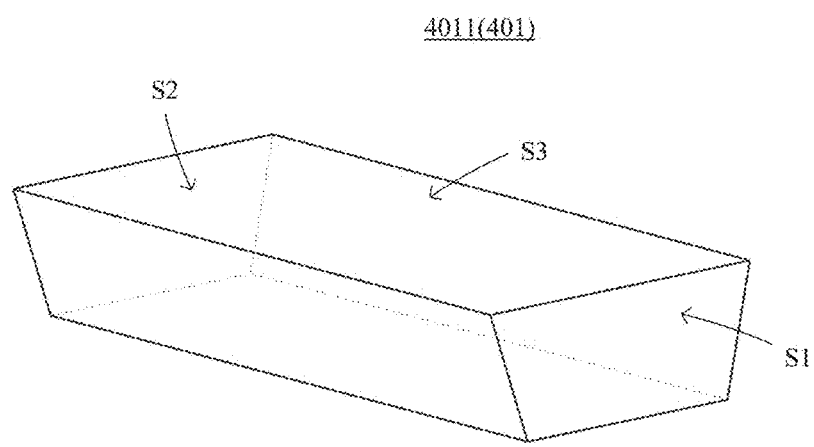
FIGS. 9 to 14 are schematic perspective views showing six types of a protrusion provided in the embodiments of the present application.
Figure 10:
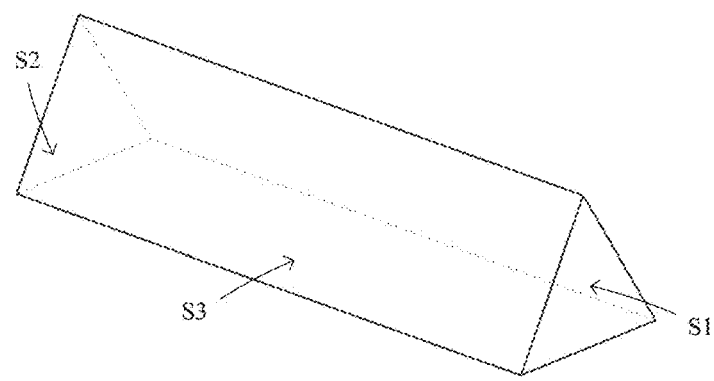
Figure 11:
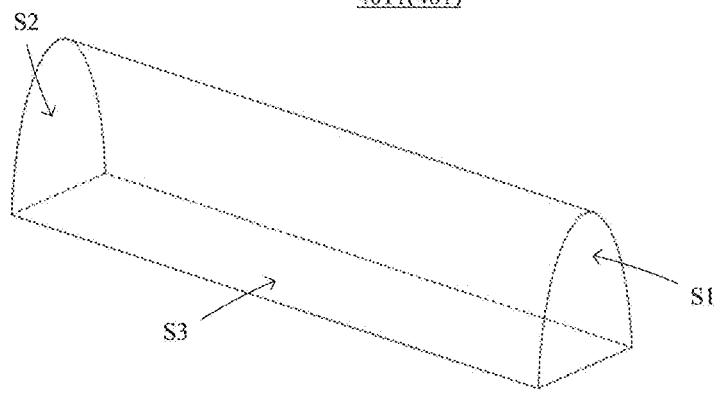

In one embodiment, as shown in FIGS. 9 to 11, the protrusions 401 include first protrusions 4011 in the form of a column. A top S1 of the first protrusion 4011 is parallel to its bottom S2. In conjunction with FIGS. 1 to 8, at least one side S3 of the first protrusion 4011 is parallel and positioned near either the array substrate 10 or the color filter substrate 20. In a length direction, the first protrusion 4011 has an orthographic projection projected on the color filter substrate 20 that covers n color resist portions 01 with the same color, where n is a positive integer. An orthographic projection of the top S1 projected on the color filter substrate 20 is positioned between the corresponding two color resist portions 01, and an orthographic projection of the bottom S2 projected on the color filter substrate 20 is also positioned between the corresponding two color resist portions 01. A size of the orthographic projection of the top S1 of the first protrusion 4011 can range from a diameter of 5 μm to 21 μm, and a thickness of the first protrusion 4011 can range from 2 μm to 7 μm.

Specifically, in this embodiment, the column-shaped first protrusion 4011, as shown in, for example, FIGS. 9 and 10, can take the form of a prism or, as shown in FIG. 11, can be a semicylinder or semielliptical cylinder. It's important to note that, in accordance with the discussion above regarding the orientation of the protrusions, from a cross-sectional perspective, the optical protective layer 402 can be disposed near a trapezoidal bottom edge (a short side) as depicted in FIG. 9, or disposed near one of vertices as depicted in FIG. 10, or disposed close to an apex of the semicircular or semielliptical protrusion as depicted in FIG. 11. Furthermore, the size of the side S3 of the first protrusion 4011 can be greater than the size of both the top S1 and the bottom S2.

It can be understood that in the first protrusion 4011, the top S1 and the bottom S2 are both perpendicular to the array substrate 10 (i.e., perpendicular to the color filter substrate 20). This configuration enables the side S3 to be parallel to the array substrate 10 and situated near the array substrate 10 or the color filter substrate 20, facilitating the combination of the first protrusion 4011 with other film layers in the array substrate 10 or the color filter substrate 20 and maximizing the effectiveness of the first protrusion 4011. Furthermore, in this embodiment, the column-shaped first protrusion 4011 in the length direction can precisely cover a whole number of the color resist portions 01. This not only reduces the edge effects of the first protrusion 4011 but also enhances the uniformity of the light passing through adjacent and identically colored color resist portions 01.

For instance, if the subpixel dimensions are 21 µm×63 µm, the first protrusion 4011, with its "orthographic projection" size close to the subpixel dimensions, can directly cover a subpixel. In the case of using the first protrusion 4011 with the top S1 having an orthographic projection size of 7 µm as shown in FIG. 11, it is necessary to arrange three of these first protrusions 4011 in a width direction of the subpixel to cover the entire subpixel.

In one embodiment, as illustrated in FIGS. 1 to 11, the color resist portion 01 is covered in a width direction by an orthographic projection of m consecutive and parallel first protrusions 4011 projected on the color filter substrate 20, where m is a positive integer. An orthographic projection of the side S3 of each of these m first protrusions 4011 projected on the color filter substrate 20 is positioned between the corresponding two color resist portions 01. It should be noted that in the previous discussion, the orthographic projection of the first protrusion 4011 projected on the color filter substrate 20 can precisely cover an integer number of identically colored color resist portions 01 in the length direction, and there is no specific requirement for the "orthographic projection" to cover an integer number of identically colored or differently colored color resist portions 01 in the width direction. Specifically, the color resist portions 01 in the "orthographic projection" width direction can be covered by an integer number of consecutive and parallel first protrusions 4011, creating multiple convergence points.

Figure 15:
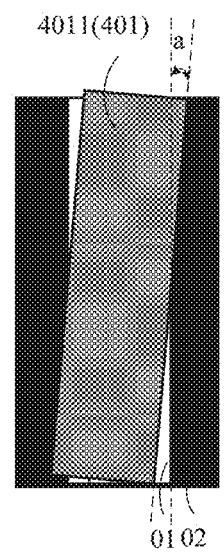
FIG. 15 is a top schematic view of the protrusion and a color filter substrate in the embodiments of the present application.

In one embodiment, as shown in FIG. 15 and in conjunction with FIGS. 1 to 8, a boundary of the orthographic projection of the first protrusion 4011 projected on the color filter substrate 20 is positioned between the corresponding color resist portion 01 and the adjacent color resist portion 01. The orthographic projection of the first protrusion 4011 projected on the color filter substrate 20 with respect to the corresponding color resist portion 01 forms an angle a (ranging from 5 degrees to 15 degrees). It can be understood that there may be Moiré interference between multiple subpixels each composed of at least one color resist portion 01 and multiple column-shaped first protrusions 4011. In this embodiment, by setting the orthographic projection of the first protrusion 4011 projected on the color filter substrate 20 at the angle a with respect to the corresponding color resist portion 01, the likelihood of the orthographic projection of the side S3 aligning parallel to the boundary of the color resist portion 01 is reduced, thereby mitigating the Moiré effect.

Figure 12:
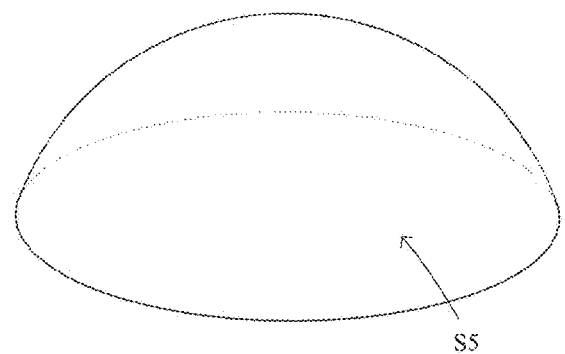
Figure 13:
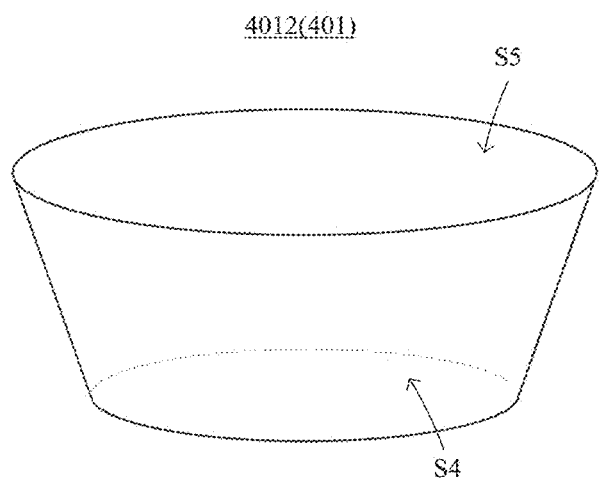
Figure 14:
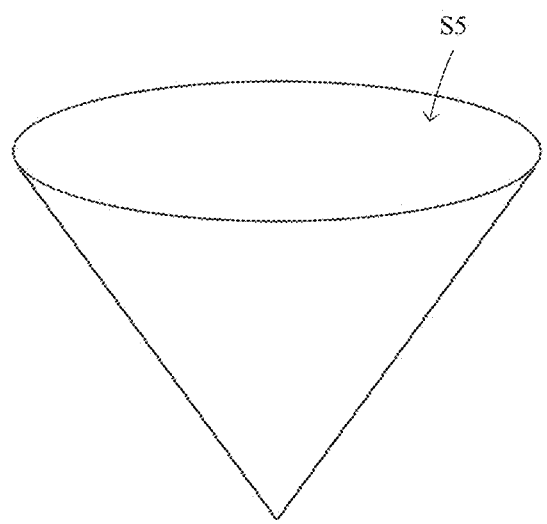

In one embodiment, as shown in FIGS. 12 to 14, the protrusions 401 includes second protrusions 4012 shaped like a cone, a truncated cone, or a hemisphere. Furthermore, at least one of the top S4 and the bottom S5 of the second protrusion 4012 is parallel to the array substrate 10. An orthographic projection of the second protrusion 4012 projected on the color filter substrate 20 covers the corresponding color resist portion 01, and a boundary of the orthographic projection of the second protrusion 4012 projected on the color filter substrate 20 is positioned between the color resist portions 01.

Specifically, in this embodiment, at least one of the top S4 and the bottom S5 of the second protrusion 4012 is parallel to the array substrate 10. A cross-section of the second protrusion 4012 parallel to the array substrate 10 can be polygonal, circular, or elliptical, which also facilitates the combination of the second protrusion 4012 with other film layers in the array substrate 10 or the color filter substrate 20, maximizing the effectiveness of the second protrusion 4012. It is not restricted whether the second protrusions 4012 are in a one-to-one correspondence with the multiple color resist portions 01 in this embodiment. The orthographic projection of the second protrusion 4012 projected on the color filter substrate 20 perfectly covers at least one corresponding color resist portion 01, and the boundary of the orthographic projection of the second protrusion 4012 projected on the color filter substrate 20 is positioned between the color resist portions 01 (for example, can extend beyond the boundary of the corresponding subpixel by 1 µm to 3 µm), thus effectively reducing the edge effects of the second protrusion 4012.

In particular, if the sizes of multiple subpixels are different, the sizes of the corresponding multiple second protrusions 4012 can also be set to correspond to the sizes of the respective multiple subpixels to extend beyond the boundaries of the corresponding subpixels. For example, if the subpixel size is 21 µm×63 µm, three second protrusions 4012 with an "orthographic projection" diameter of 21 µm are arranged along the length direction of the subpixel.

Figure 16:
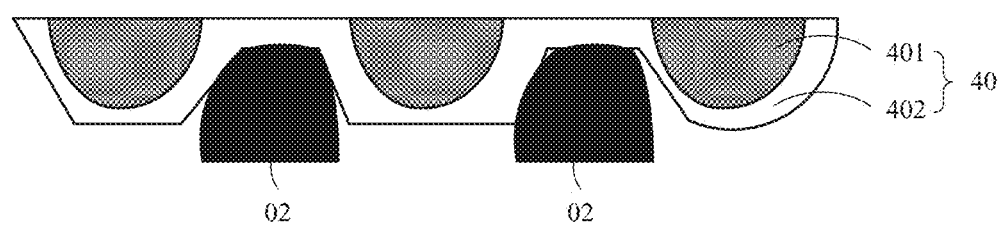
FIG. 16 is a cross-sectional schematic view of the protrusion and the color filter substrate according to another embodiment of the application.

In one embodiment, as shown in FIGS. 2 to 8, one side of the optical protective layer 402 away from the optical structure layer (including the protrusions 401) is flat. Alternatively, as shown in FIG. 16, on the side of the optical protective layer 402 away from the optical structure layer, there is a recessed area, recessed from one side closer to the optical protective layer 402, in a portion of the optical protective layer 402 between adjacent protrusions 401, as compared to a portion of the optical protective layer 402 corresponding to the protrusions 401. The recessed area is filled with black portions 021 between every two adjacent color resist portions 01. Specifically, in conjunction with the discussion above, the black matrix 02 fills gaps formed by the color resist portions 01, i.e., the black portion 021 between every two adjacent color resist portions 01 is at least used to form the black matrix 02.

In this embodiment, it can be understood that, by setting the side of the optical protective layer 402 away from the optical structure layer (including the protrusions 401) as flat, it facilitates the combination of the optical protective layer 402 with other film layers. Alternatively, in this embodiment, by using the optical protective layer 402 to form a recessed area and filling it with black portions 021, the present application reduces crosstalk between light of different colors passing through adjacent protrusions 401, thus correcting color aberration. The black portions 021 can be realized using a self-leveling process.

Figure 2:
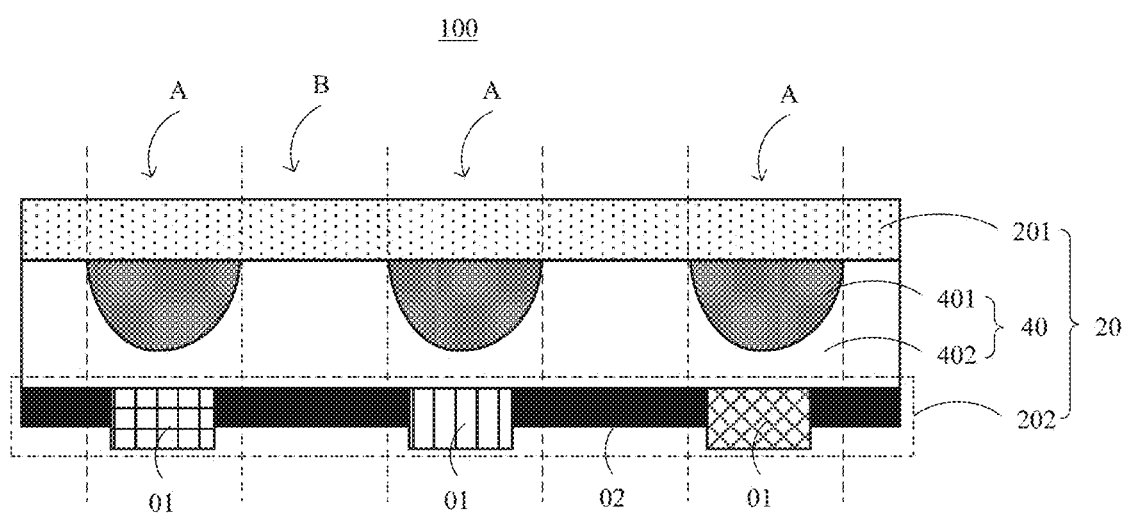
Figure 3:
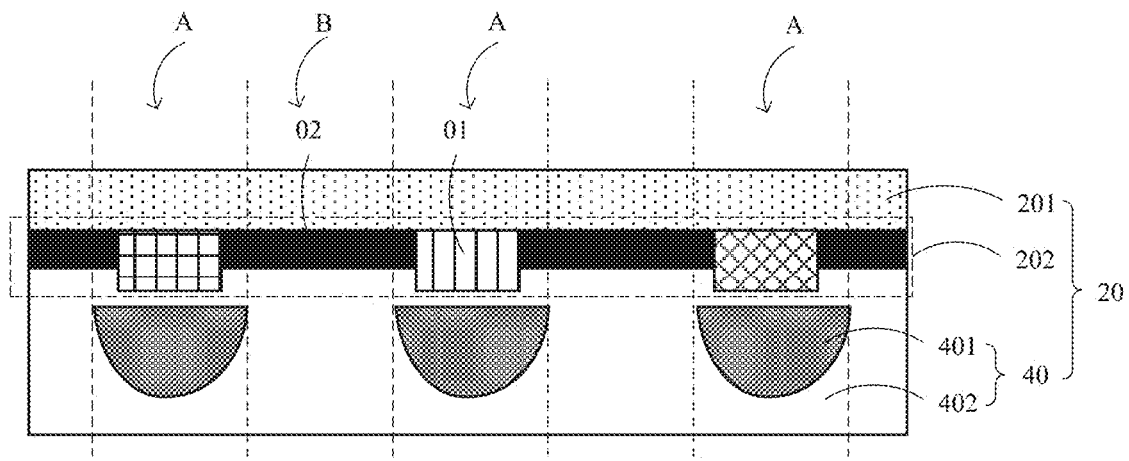

In one embodiment, as shown in FIGS. 2 to 8, the color filter substrate 20 includes: a first substrate 201; a color filter layer 202 located on one side of the first substrate 201 near the array substrate 10 and including the color resist portions 01. In this arrangement, as shown in FIG. 2, the optical layer 40 is positioned between the first substrate 201 and the color filter layer 202, or, as shown in FIG. 3, the optical layer 40 is located on one side of the color filter layer 202 near the array substrate 10. The refractive index of the protrusions 401 can range from 1.6 to 18, the refractive index of the optical protective layer 402 can range from 1.3 to 1.5, and a difference in refractive indices between the protrusion 401 and the optical protective layer 402 can be greater than 0.1.

Specifically, as shown in FIG. 3, based on the structure where the optical layer 40 is located on the side of the color filter layer 202 near the array substrate 10, the present application can directly manufacture the color filter layer 202 and the optical layer 40 sequentially on the first substrate 201. Manufacturing the optical layer 40 can be understood as first producing a portion of the optical protective layer 402 on the first substrate 201, and then sequentially manufacturing the protrusions 401 and another portion of the optical protective layer 402. This approach, as per this embodiment, can enhance the alignment precision of the optical layer 40 with the color resist portions 01. A thickness of the optical layer 40 can be less than 5 µm. For example, a maximum width of a cross-section of the side of the protrusion 401 parallel to the color filter substrate 20 can be one-third of the width of the corresponding subpixel. In other words, the subpixel in the width direction can be covered by at least three protrusions 401, reducing the risk of light leakage due to an excessive thickness of the optical layer 40.

More specifically, as shown in FIG. 2, based on the structure where the optical layer 40 is located between the first substrate 201 and the color filter layer 202, the present application can directly manufacture the protrusion 401 (for example, by a photolithography process, but the present application is not limited in this regard), the optical protective layer 402, and the color filter layer 202 sequentially on the first substrate 201. As discussed earlier, since the optical layer 40 is at least disposed corresponding to the color resist portions 01, this embodiment can also enhance the alignment accuracy of the optical layer 40 with the color resist portions 01. The thickness of the optical layer 40 can be less than 10 µm, reducing the risk of warping of the first substrate 201 due to excessive thickness. However, compared to the embodiment in FIG. 3, the embodiment in FIG. 2, due to the optical layer 40 being disposed away from the liquid crystal layer 50, can reduce a distance between the color filter layer 202 and the array substrate 10 and reduce the risk of light leakage and color crosstalk when light enters the color filter layer 202.

Figure 4:
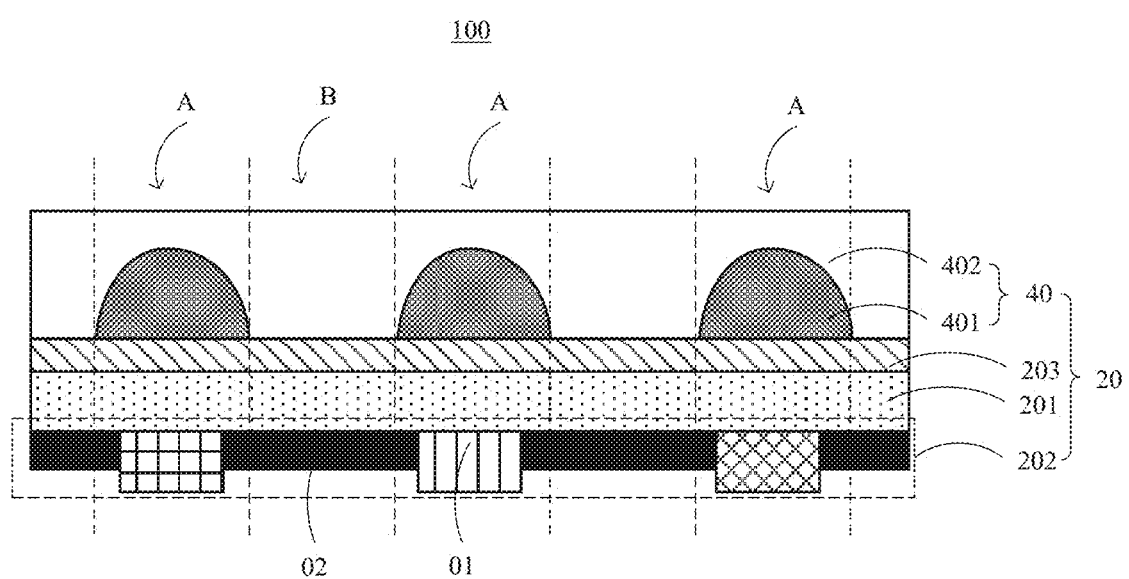
Figure 5:
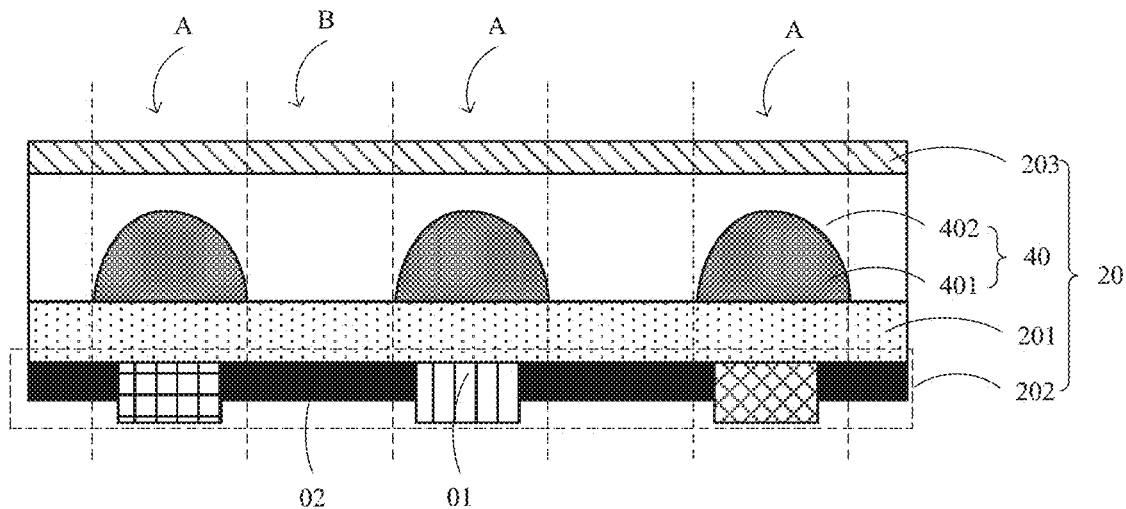

In one embodiment, as shown in FIGS. 4 and 5, the color filter substrate 20 includes: an upper polarizer 203. In conjunction with FIG. 1, the color filter substrate 20 is disposed on one side of the color resist portions 01 away from the array substrate 10. As shown in FIG. 4, the optical layer 40 is positioned on one side of the upper polarizer 203 away from the color resist portions 01. Alternatively, as shown in FIG. 5, the optical layer 40 is disposed on the side of the upper polarizer 203 near the color resist portions 01.

Specifically, in this embodiment, the optical layer 40 is located above the second substrate 101. The optical layer 40 can be directly manufactured on top of the first substrate 201 after the assembly of the array substrate 10 and the color filter substrate 20, or the optical layer 40 can be manufactured by directly adhering the optical layer 40. This adhering process may require an adhering accuracy of within ±3 µm. It should be noted that, compared to the embodiments shown in FIGS. 4 and 5, the embodiments in FIGS. 2 and 3 provide higher alignment precision between the protrusions and the corresponding color resist portions 01 due to the optical layer 40 being adjacent to the color resist portions 01.

Figure 6:
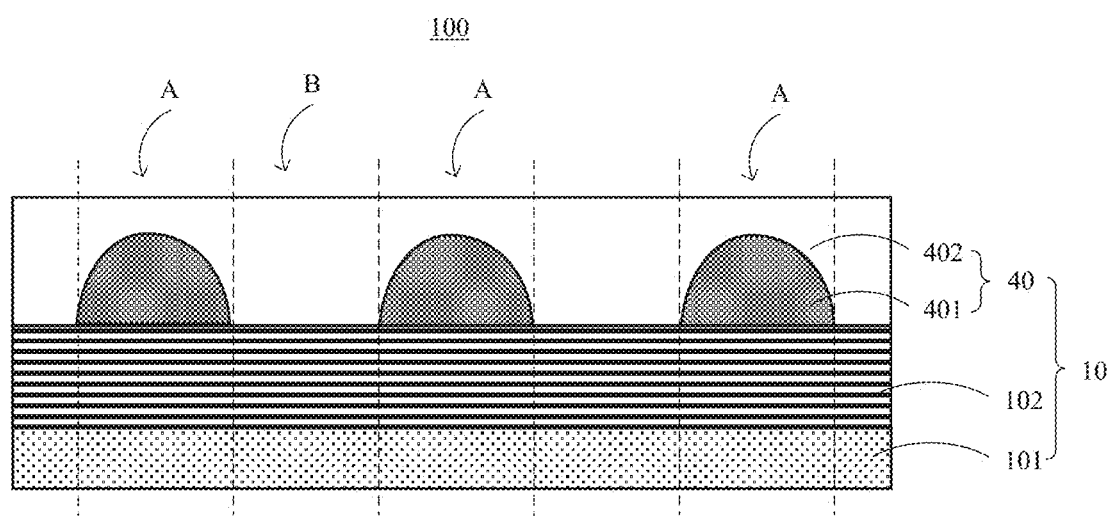

In one embodiment, as shown in FIGS. 6 and 8, the array substrate 10 includes: a second substrate 101; a circuit layer 102 disposed on one side of the second substrate 101 near the color filter substrate 20 and including multiple opening areas A corresponding to the color resist portions 01. As shown in FIG. 6, the optical layer 40 is positioned on one side of the circuit layer 102 near the color filter substrate 20. Alternatively, as shown in FIG. 8, the optical layer 40 is positioned on one side of the second substrate 101 away from the color filter substrate 20.

Based on the above discussion, it can be known that, the array substrate 10 can include a plurality of pixel electrodes located in the respective opening areas A, a plurality of pixel driving circuits arranged in the non-opening areas B, and a plurality of gate lines and a plurality of data lines that cross each other. Each pixel driving circuit is electrically connected to the corresponding gate line, the corresponding data line, and the corresponding pixel electrode. Under the influence of the corresponding gate line and data line, each pixel electrode generates the corresponding pixel voltage. The circuit layer 102 can include the pixel driving circuits, the gate lines, and the data lines. The pixel driving circuits can include driving transistors. The gate lines and the data lines can be respectively located in the same layer as some structures of the driving transistors. Above the driving transistors, there may be an insulating layer, a planarization layer, and multiple pixel electrodes arranged sequentially.

Specifically, as shown in FIG. 6, when the optical layer 40 is located above the circuit layer 102, to ensure electrical connectivity between the pixel electrodes and the pixel driving circuit, vias can be implemented in the optical layer 40. These vias bridge between the pixel electrodes disposed above the circuit layer 102 and the pixel driving circuits located below the circuit layer 102. In this context, the thickness of the optical layer 40 can be less than 3 µm, which helps reduce the precision requirements for hole-drilling processes and lowers the risk of any anomalies in the bridged electrical connections.

Specifically, as shown in FIG. 8, the array substrate 10 can also include a lower polarizer 103 situated on the second substrate 101 and away from the color filter substrate 20. The optical layer 40 can be positioned beneath the lower polarizer 103. For example, the maximum width of the side of the protrusion 401 parallel to the color filter substrate 20 in a cross-section can be equal to one-third of the width of the corresponding subpixel. It can be understood that the subpixel in the width direction can be covered by at least three protrusions 401. In this scenario, the thickness of the optical layer 40 can be equal to half of the width in the cross-section of the side of the protrusion 401 parallel to the color filter substrate 20. Under these conditions, it is possible to either include or exclude the optical protective layer 402. If the optical protective layer 402 is included, the refractive index difference between the protrusion 401 and the optical protective layer 402 should be at least 0.1. If the optical protective layer 402 is not included, the refractive index of the protrusion 401 can range from 1.3 to 1.8.

Figure 7:
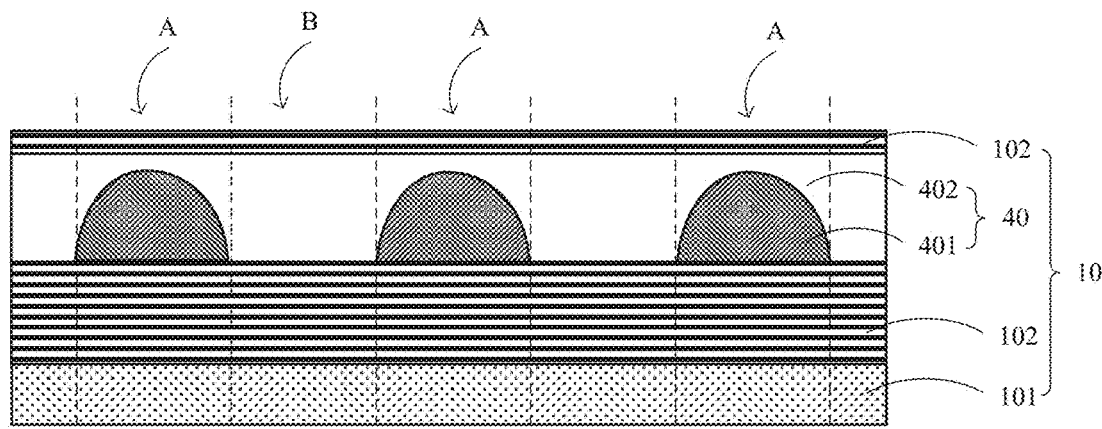

In one embodiment, as shown in FIG. 7, the array substrate 10 includes: a metal layer (belonging to the circuit layer 102); the insulating layer mentioned above, located on at least one side of the metal layer and arranged in the same layer as the optical structure layer (including the protrusions 401); the planarization layer discussed above, situated on at least one side of the insulating layer and arranged in the same layer as the optical protective layer 402. Specifically, the optical layer 40 can be placed within the array substrate 10 during the manufacturing process of the array substrate. The optical protective layer 402 and the planarization layer can be produced using the same process and the same materials (including, but not limited to, resin). The refractive index of the protrusion 401 can range from 1.6 to 1.8. The protrusion 401 can be manufactured using high-temperature-resistant adhesive material or, alternatively, produced using the same process and the same materials (including, but not limited to, silicon nitride) as the insulating layer.

In another embodiment, as shown in FIGS. 1 to 8, the array substrate 10 includes the second substrate discussed earlier; the circuit layer discussed earlier, located on one side of the second substrate 101 near the color filter substrate 20, including a first metal layer and a second metal layer situated on one side of the first metal layer near the color filter substrate 20. The first metal layer has a higher reflectance than the second metal layer.

Specifically, the composition materials for the first metal layer with higher reflectance can include metals such as aluminum (Al), titanium (Ti), or combinations thereof. Aluminum can achieve a reflectance of over 90%, significantly enhancing the backlight module's light recycling efficiency. The second metal layer with lower reflectance can be composed of metals like molybdenum (Mo) or copper, where molybdenum has an absorptance of 40% to 50%, and copper has a lower reflectance, effectively reducing the reflectance of the second metal layer and minimizing the impact of ambient light reflections on the screen. Certainly, a light-shielding layer, below the active layer of the driving transistors, can be made of metal Mo or MoOx to block direct illumination from the backlight module to the driving transistors, thus preventing increased leakage current in the driving transistors and improving their switching characteristics.

The present application provides an electronic terminal, and the electronic terminal includes a display panel as described above.

This application provides a display panel and an electronic terminal that include multiple opening areas, including: an array substrate; a color filter substrate disposed opposite to the array substrate and including a plurality of color resist portions located in the respective opening areas; a backlight module disposed on one side of the array substrate, away from the color filter substrate. Through configuring the optical layer for light convergence to be positioned within at least one of the color filter substrate and the array substrate, and by arranging the optical layer to be disposed corresponding to at least the color resist portions, this application effectively focuses large-angle light towards a central area of the display panel. Consequently, the light passing through the optical layer is composed of smaller-angle rays, reducing an amount of interference light and enhancing the display quality of the display panel.

The display panel and the electronic terminal provided in the embodiments of the present application are described in detail as above. Specific examples are used in the present disclosure to elucidate the principles and implementations of the present application. The explanations in the above embodiments are only meant to facilitate understanding of the technical solutions and the core ideas of the present application. Those skilled in the art should understand that they can still modify the technical solutions described in the above embodiments or make equivalent substitutions for some technical features. These modifications or substitutions do not depart from the scope of the technical solutions in the embodiments of the present application.

What is claimed is:

1. A display panel, comprising a plurality of opening areas, the display panel comprising:
    an array substrate;
    a color filter substrate disposed opposite to the array substrate and comprising a plurality of color resist portions located in the opening areas;
    a backlight module disposed on one side of the array substrate farthest from the color filter substrate; and
    an optical layer disposed in at least one of the color filter substrate and the array substrate and arranged corresponding to at least the plurality of color resist portions, wherein the optical layer is configured to converge light;
    wherein the optical layer comprises:
        an optical structure layer, comprising a plurality of protrusions; and
        an optical protective layer, at least disposed on a first side of the optical structure layer, wherein the first side is a side where the plurality of protrusions protrude;
        wherein a refractive index of the plurality of protrusions is greater than a refractive index of the optical protective layer;
    wherein the plurality of protrusions comprise a plurality of first protrusions, the plurality of first protrusions are column-shaped, a top of each of the plurality of first protrusions is parallel to a bottom of the first protrusion, and at least one side of each of the plurality of first protrusions is parallel to and located adjacent to either the array substrate or the color filter substrate;
    wherein in a length direction, an orthographic projection of each of the plurality of first protrusions projected on the color filter substrate covers n of the plurality of color resist portions of a same color, n is a positive integer; an orthographic projection of the top of each first protrusion projected on the color filter substrate is positioned between two corresponding ones of the plurality of color resist portions; and an orthographic projection of the bottom of each first protrusion is positioned between two corresponding ones of the plurality of color resist portions.

2. The display panel as claimed in claim 1, wherein the color filter substrate comprises:
    a first substrate; and
    a color filter layer disposed on one side of the first substrate nearest the array substrate and comprising the plurality of color resist portions;
    wherein the optical layer is disposed between the first substrate and the color filter layer, or the optical layer is disposed on one side of the color filter layer nearest the array substrate.

3. The display panel as claimed in claim 1, wherein the color filter substrate comprises:
    an upper polarizer disposed on one side of the plurality of color resist portions farthest from the array substrate;
    wherein the optical layer is disposed on one side of the upper polarizer farthest from the plurality of color resist portions, or the optical layer is disposed on one side of the upper polarizer nearest the plurality of color resist portions.

4. The display panel as claimed in claim 1, wherein the array substrate comprises:
    a second substrate; and
    a circuit layer disposed on one side of the second substrate nearest the color filter substrate and comprising a plurality of driving transistors disposed corresponding to the plurality of color resist portions, wherein the optical layer is disposed on one side of the circuit layer nearest the color filter substrate, or the optical layer is disposed on one side of the second substrate farthest from the color filter substrate.

5. The display panel as claimed in claim 1, wherein the array substrate comprises:

a metal layer;

an insulating layer disposed on at least one side of the metal layer and arranged in a same layer as the optical structure layer; and a planarization layer disposed on at least one side of the insulating layer and arranged in the same layer as the optical protective layer.

6. The display panel as claimed in claim 1, wherein the color resist portions are covered in a width direction by an orthographic projection of m consecutive and parallel ones of the first protrusions projected on the color filter substrate, with m being a positive integer, and an orthographic projection of the at least one side of each of the m first protrusions projected on the color filter substrate is located between corresponding two of the color resist portions.

7. The display panel as claimed in claim 1, wherein a boundary of the orthographic projection of each of the first protrusions projected on the color filter substrate is located between the corresponding color resist portion and the adjacent color resist portion, and the orthographic projection of each of the first protrusions projected on the color filter substrate forms an angle with the corresponding color resist portion.

8. A display panel, comprising a plurality of opening areas, comprising:

an array substrate;

a color filter substrate disposed opposite to the array substrate and comprising a plurality of color resist portions located in the opening areas;

a backlight module disposed on one side of the array substrate farthest from the color filter substrate; and an optical layer disposed in at least one of the color filter substrate and the array substrate and arranged corresponding to at least the plurality of color resist portions, wherein the optical layer converges light;

wherein the optical layer comprises an optical structure layer comprising a plurality of protrusions, the plurality of protrusions comprise a plurality of first protrusions, the plurality of first protrusions are column-shaped, a top of each of the plurality of first protrusions is parallel to a bottom of the first protrusion, and at least one side of each of the plurality of first protrusions is parallel to and located adjacent to either the array substrate or the color filter substrate;

wherein in a length direction, an orthographic projection of each of the plurality of first protrusions projected on the color filter substrate covers n of the plurality of color resist portions of a same color, n is a positive integer; an orthographic projection of the top of each first protrusion projected on the color filter substrate is positioned between two corresponding ones of the plurality of color resist portions; and an orthographic projection of the bottom of each first protrusion is positioned between two corresponding ones of the plurality of color resist portions.

9. The display panel as claimed in claim 8, wherein the optical layer comprises:

an optical structure layer, comprising a plurality of protrusions; and an optical protective layer, at least disposed on a first side of the optical structure layer, wherein the first side is a side where the plurality of protrusions protrude;

wherein a refractive index of the plurality of protrusions is greater than a refractive index of the optical protective layer.

10. The display panel as claimed in claim 9, wherein the color filter substrate comprises:

a first substrate; and a color filter layer disposed on one side of the first substrate nearest the array substrate and comprising the plurality of color resist portions;

wherein the optical layer is disposed between the first substrate and the color filter layer, or the optical layer is disposed on one side of the color filter layer nearest the array substrate.

11. The display panel as claimed in claim 9, wherein the color filter substrate comprises:

an upper polarizer disposed on one side of the plurality of color resist portions farthest from the array substrate;

wherein the optical layer is disposed on one side of the upper polarizer farthest from the plurality of color resist portions, or the optical layer is disposed on one side of the upper polarizer nearest the plurality of color resist portions.

12. The display panel as claimed in claim 9, wherein the array substrate comprises:

a second substrate; and a circuit layer disposed on one side of the second substrate nearest the color filter substrate and comprising a plurality of driving transistors disposed corresponding to the plurality of color resist portions, wherein the optical layer is disposed on one side of the circuit layer nearest the color filter substrate, or the optical layer is disposed on one side of the second substrate farthest from the color filter substrate.

13. The display panel as claimed in claim 9, wherein the array substrate comprises:

a metal layer;

an insulating layer disposed on at least one side of the metal layer and arranged in a same layer as the optical structure layer; and a planarization layer disposed on at least one side of the insulating layer and arranged in the same layer as the optical protective layer.

14. The display panel as claimed in claim 8, wherein the color resist portions are covered in a width direction by an orthographic projection of m consecutive and parallel ones of the first protrusions projected on the color filter substrate, with m being a positive integer, and an orthographic projection of the at least one side of each of the m first protrusions projected on the color filter substrate is located between corresponding two of the color resist portions.

15. The display panel as claimed in claim 8, wherein a boundary of the orthographic projection of each of the first protrusions projected on the color filter substrate is located between the corresponding color resist portion and the adjacent color resist portion, and the orthographic projection of each of the first protrusions projected on the color filter substrate forms an angle with the corresponding color resist portion.

16. The display panel as claimed in claim 9, wherein the plurality of protrusions comprise a plurality of second protrusions, and the plurality of second protrusions are in a shape of cone, truncated cone, or hemisphere; at least one of a top and a bottom of each of the plurality of second protrusions is parallel to the array substrate;

wherein an orthographic projection of each of the plurality of second protrusions projected on the color filter substrate covers the corresponding color resist portion, and a boundary of the orthographic projection of each of the plurality of second protrusions projected on the color filter substrate is positioned between the color resist portions.

17. The display panel according to claim 9, wherein the optical protective layer is flat on one side farthest from the optical structure layer; or alternatively, one side of the optical protective layer farthest from the optical structure layer is provided with a recessed area, recessed from one side adjacent to the optical protective layer and located in a gap of the optical protective layer between every two adjacent protrusions, as compared to a portion of the optical protective layer corresponding to the protrusions, wherein the recessed area is filled with black portions between every two adjacent color resist portions.

18. The display panel according to claim 8, wherein the array substrate comprises:
    a second substrate; and
    a circuit layer disposed on one side of the second substrate nearest the color filter substrate and comprising a first metal layer and a second metal layer located on one side of the first metal layer nearest the color filter substrate,
    wherein a reflectance of the first metal layer is greater than a reflectance of the second metal layer.

19. An electronic terminal, comprising a display panel provided with a plurality of opening areas, the display panel comprising:
    an array substrate;
    a color filter substrate disposed opposite to the array substrate and comprising a plurality of color resist portions located in the opening areas;
    a backlight module disposed on one side of the array substrate farthest from the color filter substrate; and
    an optical layer disposed in at least one of the color filter substrate and the array substrate and arranged corresponding to at least the plurality of color resist portions, wherein the optical layer is configured to converge light;
    wherein the optical layer comprises an optical structure layer comprising a plurality of protrusions, the plurality of protrusions comprise a plurality of first protrusions, the plurality of first protrusions are column-shaped, a top of each of the plurality of first protrusions is parallel to a bottom of the first protrusion, and at least one side of each of the plurality of first protrusions is parallel to and located adjacent to either the array substrate or the color filter substrate;
    wherein in a length direction, an orthographic projection of each of the plurality of first protrusions projected on the color filter substrate covers n of the color resist portions of a same color, n is a positive integer; an orthographic projection of the top of each first protrusion projected on the color filter substrate is positioned between two corresponding ones of the plurality of color resist portions; and an orthographic projection of the bottom of each first protrusion is positioned between two corresponding ones of the plurality of color resist portions.

\* \* \* \* \*